UNITED STATES PATENT OFFICE.

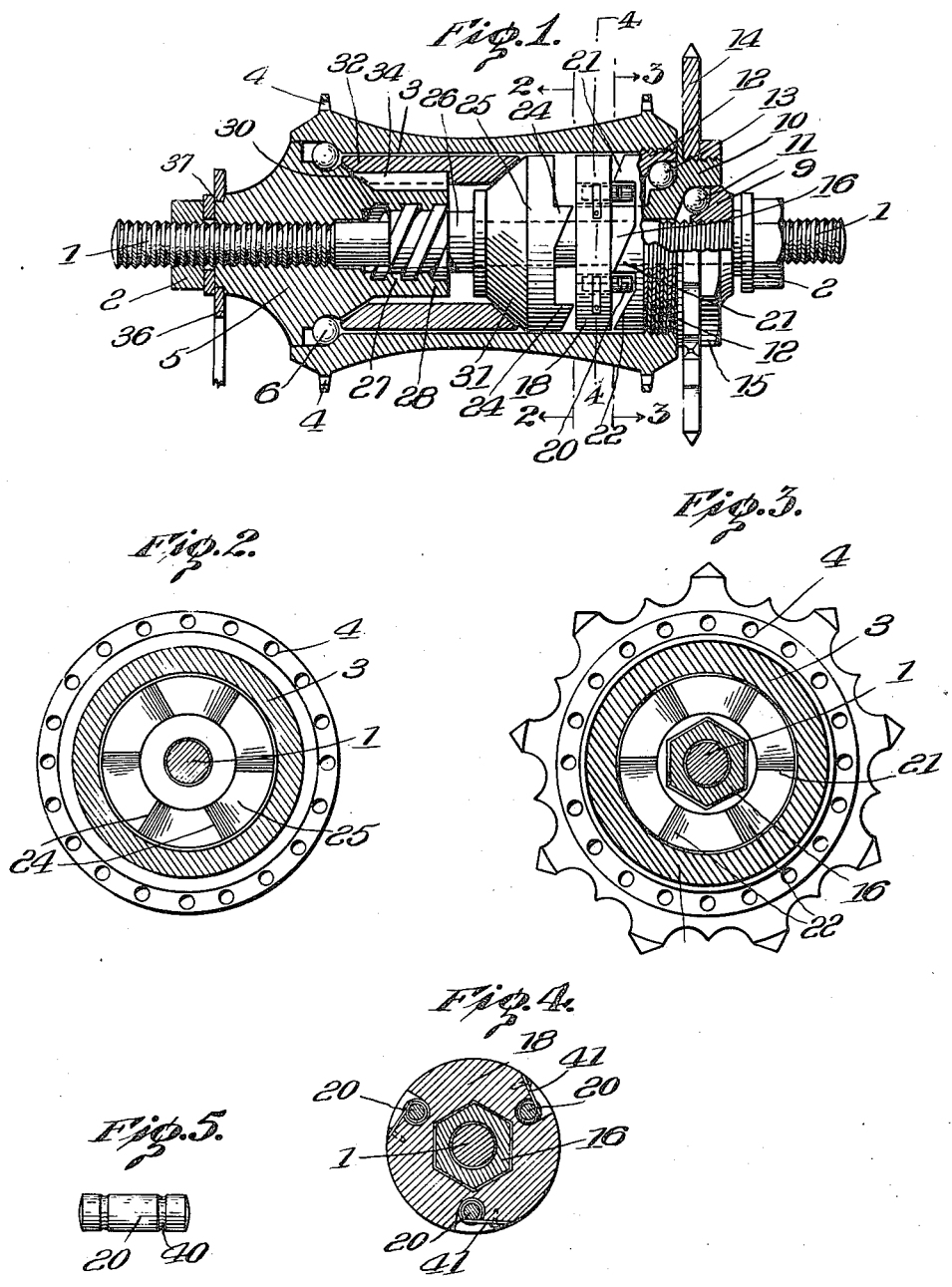

NOAH L. WINE, OF FORT MYERS, FLORIDA, ASSIGNOR, BY MESNE ASSIGNMENTS, TO BUFFALO METAL GOODS COMPANY, OF BUFFALO, NEW YORK, A CORPORATION OF NEW YORK.

COASTER, DRIVING, AND BRAKING MECHANISM.

1,278,544.      Specification of Letters Patent.      Patented Sept. 10, 1918.

Application filed December 12, 1916.    Serial No. 136,469.

*To all whom it may concern:*

Be it known that I, NOAH L. WINE, a citizen of the United States, residing at Fort Myers, in the county of Lee and State of Florida, have invented new and useful Improvements in Coaster, Driving, and Braking Mechanism, of which the following is a specification.

This invention relates to a coaster driving and braking mechanism for bicycles and consists in an improved construction and arrangement designed particularly to be of few and substantial parts and to be positive and quickly responsive in its operation. In my improved device the parts are arranged to be inclosed within the hub of the wheel and are adapted, upon forward rotation of the driving member or sprocket to couple the wheel thereto when the driving member is at rest to permit the wheel and hub to rotate entirely free and upon the reverse rotation of the driving member to actuate a suitable brake to have frictional braking engagement with the hub.

A desirable embodiment of the features of my invention is shown in the accompanying drawing wherein similar reference numerals are applied to the corresponding parts in the several views.

Referring to the drawing Figure 1 is a longitudinal sectional view of a coaster-brake constructed in accordance with my invention. Fig. 2 is a cross-sectional view thereof on line 2—2 thereof looking toward the left, Fig. 3 is a similar view in line 3—3 of Fig. 1 looking toward the right. Fig. 4 is a cross-sectional view on line 4—4 and Fig. 5 is a view showing one of the coupling pins in elevation.

In the approved form of my invention here shown, 1, indicates the stationary axle for the wheel, which is threaded at its end portions to receive the usual securing nuts 2—2 for clamping it to the forks of the cycle frame. The hub-barrel 3, of suitable form to inclose the parts and having spoke flanges 4, is journaled to rotate concentrically with the axle upon suitable ball bearings.

Referring first to the journaling of the hub, it is arranged at one side that the hub shall rotate upon a brake and bearing member 5; suitable ball bearings 6, fitted to a ball race formed between the hub and the member 5, are shown for this purpose. At the opposite side a bearing cone 9 is threaded on the axle and the driving member 10 is journaled to rotate thereon, the ball bearings 11 being interposed therebetween in a suitable ball race formed between the cone and driving member. The hub at this side is provided with a clutch and bearing sleeve 12 threaded therein and formed to coact with the peripheral surface of the driving member 10 to provide a ball race for the ball bearings 13; this arrangement thus provides for journaling of the hub upon the rotatable driving member 10, the latter having threaded thereon the usual sprocket 14 held by clamping nut 15.

Normally the hub barrel is permitted to rotate in a forward direction freely on its bearings 6 and 13 which occurs when the hub moves forwardly with respect to the operating member as when coasting. When however the driving member is moved forwardly with respect to the hub it is arranged that the driving member and hub shall be coupled together for propelling and when the operating member is rotated reversely it is arranged that a braking mechanism will function to retard the hub.

According to my invention, the means provided for effecting the clutching of the driving member with the hub whereby they will rotate in unison during the propelling or forward rotation consists in the arrangement as follows: Integrally formed on the driving member 10, there is provided an inwardly extending squared shoulder or sleeve portion 16 to which is fitted a clutch or pin carrier member 18 having a squared aperture fitting said shoulder by which it is rotatively secured to the drive member. The member 18 is provided with a plurality of bores therethrough arranged equi-distant from the central axis and within these bores clutch pins 20—20 are positioned. These pins are arranged as shown in Fig. 1 to project laterally into engagement with shoulders 21—21 formed on the clutch sleeve 12 and positioned in the path of the pins 20 with their abrupt or perpendicular surfaces opposed to the forward rotation of the latter; these shoulders as shown being formed with forwardly inclined surfaces 22, thus being of a form similar to ratchet teeth. From the arrangement, in so far as described, it will be seen that upon the forward rotation of the sprocket and with the clutch-pins 20 in the position of Fig. 1, these clutch pins will engage the abrupt shoulders of the clutch member 12 and couple the carrier member 18 and the hub to rotate together during forward rotation of the driving member to which the carrier 18 is rotatively secured by the squared sleeve as described and thus virtually a part thereof.

Upon the advance rotation of the hub with reference to the driving member, as when the latter is at rest when coasting, the inclined or cam surface 22 of the shoulders will force the pins laterally to then project on the opposite side of the carrier. The hub will then be permitted to coact entirely free and this free rotation is permitted in both directions.

It is arranged that upon the reverse rotation of the driving member the pins 20 will similarly coact with abrupt shoulders 24 on a brake actuating member 25 and thereby effect the setting of a brake to retard the hub. These shoulders are similar in their arrangement and form but are reversed in direction with reference to the shoulders 21. The brake actuating member is here shown splined or threaded to the brake bearing member 5 by means of an integral threaded sleeve 26 on the actuating member having its thread or spline 27 fitted to a complemental interior thread of a sleeve portion 28 of the member 5. By this arrangement it will be seen that upon rotation of the actuating member 25 it will produce a lateral movement of the member 25 with reference to the member 5. The brake bearing member and the brake actuating member 25 are provided with the opposed conical surfaces 30 and 31 respectively which engage similar internal surfaces of a split brake ring 32. The resulting operation is that upon shifting of the brake actuating member toward the left the surfaces 30—31 will expand the brake sleeve 32 into engagement with the internal surface of the hub 3 and as the sleeve is held against rotation by a suitable key 34, formed on the member 5 and entering a slot in the sleeve, there is provided a frictional braking engagement to retard the rotation of the hub. The brake bearing member 5 is held against rotation by the usual securing arm 36 fitted to a squared shoulder 37 thereon and attached to the cycle frame in the usual manner.

In the arrangement as shown it will be seen that upon the forward rotation of the operating member, comprising members 14, 10 and 18, all rotatively secured, the coupling pins 20, if not in the position shown in Fig. 1, will be forced toward the right into that position by the riding upon inclined surfaces of the shoulders 24. Thereafter upon forward rotation of the driving member the hub will be caused to rotate in unison therewith by reason of the engagement of the coupling pins with the abrupt shoulders 21. Upon cessation of the propelling movement of the driving member, as when coasting, the hub and its bearing member 12 will move forwardly with relation to the coupling pins with the result that the inclined surfaces 22 on the member 12 will force the pins to the left and out of position for engagement with the driving shoulders 21. However the pins will then assume a position for engaging with the shoulders 24 so that upon reverse rotation the setting of the brake will be effected as described. As best shown in Fig. 5 the coupling pins 20 are provided with circumferential grooves 40 and small spring clips 41 are carried by the member 18 in position to enter said grooves in the respective position of the coupling pin. As will be readily understood this arrangement provides for yieldingly retaining the coupling pin in the respective positions to which they are shifted by the inclined surfaces.

As will be readily understood the various features of my present invention are subject to various modifications without departing from the scope of my invention. It is therefore intended that all matter herein contained shall be interpreted as illustrative and not in a limiting sense.

Having described my invention, I claim:

1. In a driving and braking mechanism, the combination with the hub and the axle, of a driving member suitably journaled, coupling elements carried thereby and rotating therewith, braking means, a coupling member connected with the braking means and adapted to co-act with the coupling elements, a coupling member rotatively secured to the hub and adapted to co-act with the coupling elements, said coupling elements being shiftable into position of engagement with either of the coupling members and each of said coupling members being adapted to have coupling engagement with the elements in one direction and to effect the shifting of the elements into position of engagement with the other of said coupling members when the driving member is rotated in the opposite direction, and means yieldingly to retain the coupling elements in the respective coupling positions, substantially as described.

2. In a driving and braking mechanism the combination with the hub and the axle, of a driving member suitably journaled, a carrier member connected to the driving member and rotating therewith, shiftable coupling elements carried by the carrier member, braking means, a rotatable brake actuating member adapted for coupling engagement with the coupling elements, a coupling member rotatively secured to the hub and adapted to co-act with the coupling elements in coupling the driving member to the hub, said brake actuating member and said coupling member being provided with shoulder portions to engage said elements, said shoulders being of a form and arrangement to have coupling engagement with the elements in one direction and to laterally shift the elements by engagement therewith from the opposite direction, the shoulders of the brake actuating member and of the coupling member being arranged to be reversed in their action upon the coupling elements and means yieldingly to retain the coupling elements in their respective coupling positions, substantially as described.

3. In a driving and braking mechanism, the combination with the hub and the axle, of a driving member suitably journaled, a carrier member rotatively connected to the driving member, shiftable coupling pins carried by the carrier member, a brake sleeve adapted to be expanded into frictional contact with the hub, means to secure the brake sleeve from rotation, a rotatable brake actuating member provided with shoulders adapted for coupling engagement with the pins, an annular coupling member secured to the hub and provided with shoulders adapted for coupling engagement with the coupling pins, the shoulders of latter member being opposed to the pins in the forward direction of rotation whereby the driving member is coupled to the hub for propelling and the shoulders of the brake actuating member being opposed to the pins in the reversed direction for coupling the driving member and the brake actuating member during reverse rotation of the driving member and said shoulders having inclined surfaces operative to shift the pins into engaging position with the shoulders of the opposite member and means yieldingly to retain the pins in their shifted position substantially as described.

4. In a driving and braking mechanism, the combination with the hub and the axle, of a driving member suitably journaled, laterally shiftable coupling pins carried thereby and rotating therewith, braking means, a coupling member connected with the braking means and adapted to co-act with the coupling pins, a coupling member rotatively secured to the hub and adapted to co-act with the coupling pins said coupling pins being shiftable into position of engagement with either of the coupling members, each of said coupling members being adapted to have coupling engagement with the pins in one direction and to effect the shifting of the pins into position of engagement with the other of the said coupling members when the driving member is rotated in the opposite direction, resilient retaining means carried by the driving member adjacent to the pins and said pins being formed with annular grooves to be engaged by the retaining springs in the respective coupling positions of the pins, substantially as described.

5. In a driving and braking mechanism, the combination with the hub and the axle, of a driving member suitably journaled, a carrier member rotatively connected to the driving member, shiftable coupling pins carried by the carrier member, a brake sleeve adapted to be expanded into frictional contact with the hub, means to secure the brake sleeve from rotation, a rotatable brake actuating member provided with shoulders adapted for coupling engagement with the pins, an annular coupling member secured to the hub and provided with shoulders adapted for coupling engagement with the coupling pins, the shoulders of the latter member being opposed to the pins in the forward direction of rotation whereby the driving member is coupled to the hub for propelling and the shoulders of the brake actuating member being opposed to the pins in the reversed direction for coupling the driving member and the brake actuating member during reverse rotation of the driving member and said shoulders having inclined surfaces operative to shift the pins into engaging position with the shoulders of the opposite member.

In testimony whereof I have signed my name to this specification.

NOAH L. WINE.